(12) United States Patent
Egier et al.

(10) Patent No.: US 8,015,425 B1
(45) Date of Patent: Sep. 6, 2011

(54) POWER REDUCTION TECHNIQUES FOR COMPONENTS IN INTEGRATED CIRCUITS

(75) Inventors: Aaron Charles Egier, Toronto (CA); David Neto, Toronto (CA)

(73) Assignee: Altera Corporation, San Jose, CA (US)

( * ) Notice: Subject to any disclaimer, the term of this patent is extended or adjusted under 35 U.S.C. 154(b) by 64 days.

(21) Appl. No.: 12/536,298

(22) Filed: Aug. 5, 2009

Related U.S. Application Data

(62) Division of application No. 11/431,850, filed on May 9, 2006, now Pat. No. 7,587,620.

(51) Int. Cl.
  *G06F 1/00* (2006.01)
  *G06F 1/32* (2006.01)
  *G06F 17/50* (2006.01)
(52) U.S. Cl. .................. 713/323; 713/320; 716/101
(58) Field of Classification Search .................. 713/323
  See application file for complete search history.

(56) References Cited

U.S. PATENT DOCUMENTS

| | | | |
|---|---|---|---|
| 5,661,673 A * | 8/1997 | Davis | 708/628 |
| 6,115,444 A | 9/2000 | Liao | |
| 6,345,379 B1 * | 2/2002 | Khouja et al. | 716/115 |
| 6,625,784 B1 | 9/2003 | Ohta et al. | |
| 6,810,482 B1 * | 10/2004 | Saxena et al. | 713/320 |
| 7,331,024 B2 | 2/2008 | Sato et al. | |
| 7,478,356 B1 * | 1/2009 | Sundararajan et al. | 716/138 |
| 7,552,163 B2 * | 6/2009 | Son | 708/492 |
| 7,555,741 B1 * | 6/2009 | Milton et al. | 716/101 |
| 7,587,620 B1 * | 9/2009 | Egier et al. | 713/320 |

FOREIGN PATENT DOCUMENTS

JP 10021280 1/1998

OTHER PUBLICATIONS

Wilton et al., "The Impact of Pipelining on Energy per Operation in Field-Programmable Gate Arrays," in International Conference on Field-Programmable Logic and its Application. Included in Lecture Notes in Computer Science 3203, Springer-Verlag, pp. 719-728, 2004.
Steve Wilton's Publications: Power-Aware PRGAs and CAD, printed from www.ece.ubc.ca/~stevew/publications.html on Apr. 13, 2006, 5 pages.
Mendel et al., "Systems and Methods for Reducing Static and Total Power Consumption in a Programmable Logic Device," U.S. Appl. No. 10/796,501, filed Mar. 8, 2004, 50 pages.
Mendel et al., "Systems and Methods for Reducing Static and Total Power Consumption in a Programmable Logic Device," U.S. Appl. No. 10/796,502, filed Mar. 8, 2004, 81 pages.

* cited by examiner

*Primary Examiner* — Suresh K Suryawanshi
(74) *Attorney, Agent, or Firm* — Weaver Austin Villeneuve & Sampson LLP

(57) ABSTRACT

Optimizing the power used in an integrated circuit. A circuit-level transformation/permutation reduces the power consumed by multipliers or other components in integrated circuits. Signals that toggle frequently are assigned to lower power multiplier ports or the number of times a signal changes value is minimized. Large width signals are assigned to the low power port. Large multipliers are divided up and optimized as above. Pipelined multipliers are used with registers so that signals change together.

13 Claims, 13 Drawing Sheets

Writing to a RAM

Reading from a RAM

POWER REDUCTION TECHNIQUES FOR COMPONENTS IN INTEGRATED CIRCUITS

CROSS REFERENCE TO RELATED APPLICATION

This application is a divisional of prior application Ser. No. 11/431,850 filed on May 9, 2006, now pending, the disclosure of which is incorporated by reference herein in its entirety.

BACKGROUND

1. Field of the Invention

The present invention generally relates to optimization of integrated circuits. More specifically, the invention relates to mechanisms and techniques for optimizing the power used in an integrated circuit.

2. Description of Related Art

Various aspects of an integrated circuit are generally optimized to improve the efficiency of the integrated circuit. For example, reducing the power consumed by various components of a circuit can reduce the amount of heat generated and improve the performance of the integrated circuit. However, conventional techniques and mechanisms for optimizing power used in an integrated circuit are limited. For example, multipliers in a circuit design are often implemented in a field programmable gate array (FPGA) exactly as the circuit designer specifies them. No optimization technique for minimizing the power used by the multipliers is implemented.

Therefore, there is a need for improved techniques and mechanisms for optimizing power used in an integrated circuit.

SUMMARY OF THE INVENTION

The techniques and mechanisms of the present invention provide efficient and cost effective solutions for optimizing the power used in integrated circuits. For example, circuit-level transformations/assignments/permutations are provided to reduce the power used by circuit components such as multipliers, look-up-tables (LUTs), and RAM blocks. In general, power savings can be achieved by assigning signals that toggle frequently to lower power inputs and/or by minimizing the number of times a signal changes value.

One aspect of the present invention provides a method for optimizing the power consumed by a circuit component. The method includes identifying a circuit component. The circuit component has multiple ports. The method also includes identifying a power consumption rating for each port and identifying inputs for the circuit component. Next, the method includes assigning the inputs to the ports based on the power consumption ratings.

Some embodiments include permuting the inputs as well as un-permuting any outputs based on the permuted inputs. The circuit component includes, but is not limited to, a multiplier block, a RAM block, a LUT, a barrel shifter, a crossbar, or a multiplexer. If the circuit component is widely used in the electronic design, the power savings can be significant.

Another aspect of the present invention provides a method of reducing power in a circuit component. A low-power port of the circuit component is determined. A toggle rate of each input of the circuit component is also determined. The input with the highest toggle rate is assigned to the low-power port. As such, power in the circuit component is reduced.

Another aspect of the present invention provides a method of reducing power in a circuit component. The method includes determining a low-power port of the circuit component and determining which input to the circuit component has a greater width in bits. Next, the method includes assigning the input with greatest width in bits to the low-power port. As such, power in the circuit component is reduced.

Another aspect of the present invention provides a method of reducing power in a large multiplier. The method includes splitting the large multiplier into multiple smaller multipliers. The method also includes determining a low-power port of each of the smaller multipliers and determining whether an input to each of the smaller multipliers has either a high toggle rate or a large signal width. Next, the method includes assigning each of the inputs with a high toggle rate or a large signal width to the determined low-power ports of the smaller multipliers. Finally, the method includes recombining the results of the smaller multipliers into a final result. The final result is equivalent to the result of the large multiplier.

Another aspect of the present invention provides a method of reducing power in a circuit component. The circuit component with a port is determined. An input for the port that changes multiple times during a single clock cycle is identified. A register is placed before the port so that the output of the register becomes the input to the port and it changes only once per clock cycle. As such, the input toggle rate is reduced and power is reduced in the circuit component.

Another aspect of the present invention provides a method of reducing power by synchronizing the inputs of a circuit component. A circuit component with a plurality of ports or a single port with multiple signals is determined. Inputs for the port(s) that change at different times during each clock cycle are identified. Registers are placed before the port(s) so that outputs of the registers become the inputs to the port(s) and therefore the inputs change at substantially the same time during each clock cycle. As such, the inputs are synchronized and glitches inside the circuit component are reduced causing its power to be reduced.

Another aspect of the present invention provides a method of implementing an electronic device. An electronic design is received. A component of the electronic design is identified. The component has input ports for receiving input signals. A power consumption rating is identified for each of the input ports. The electronic design is updated by assigning input signals to the input ports based on the power consumption ratings. The updated electronic design is then implemented on the electronic device.

Another aspect of the present invention provides a computer program product having code for optimizing the power consumed by a circuit component. The computer program product includes code for identifying a circuit component. The circuit component has multiple ports. The computer program product also includes code for identifying a power consumption rating for each port; code for identifying inputs for the circuit component; and code for assigning the inputs to the multiple ports based on the power consumption ratings.

These and other features and advantages of the present invention will be presented in more detail in the following specification of the invention and the accompanying figures, which illustrate by way of example the principles of the invention.

BRIEF DESCRIPTION OF THE DRAWINGS

The invention may best be understood by reference to the following description taken in conjunction with the accompanying drawings, which illustrate specific embodiments of the present invention.

DETAILED DESCRIPTION OF SPECIFIC EMBODIMENTS

Figure 1:
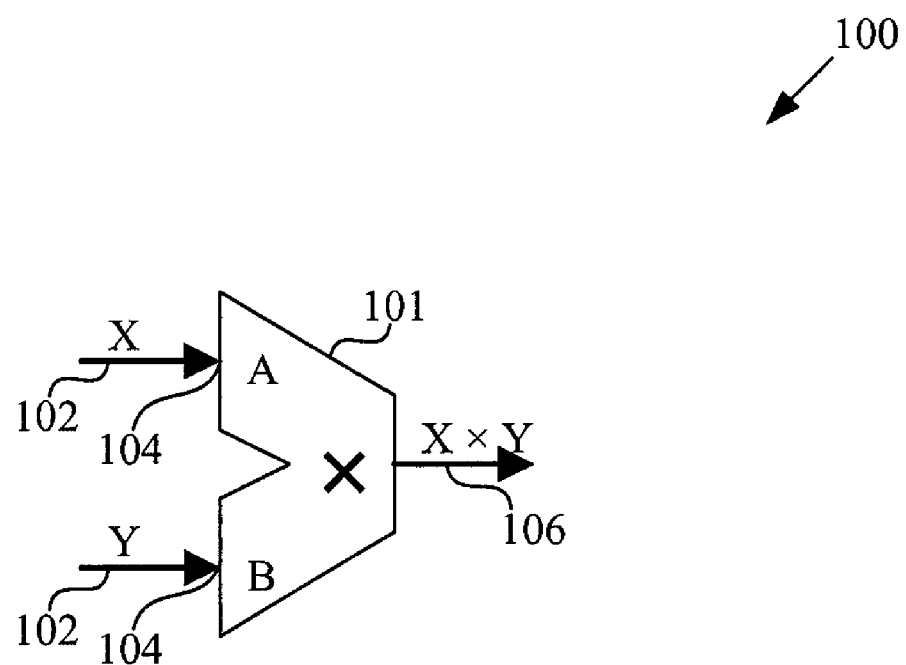
FIG. 1 illustrates a block diagram of a circuit component that can utilize various aspects of the present invention.

Reference will now be made in detail to some specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For instance, the techniques of the present invention will be described in the context of particular circuit components and design automation tools. However, it should be noted that the techniques of the present invention could be applied to a variety of circuit components and a variety of tools, including associated code provided with the tools. For example, FIGS. 1-3 each shows a multiplier, but it could instead represent any circuit component. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Various mechanisms and techniques are provided for optimizing the power used in an integrated circuit. The mechanisms and techniques of the present invention include circuit transformations that can reduce the power consumed by various circuit components. For example, a circuit-level transformation/permutation is provided to reduce the power consumed by multipliers in integrated circuits. Given a circuit with one or more multipliers, the circuit-level transformation/permutation assigns signals that toggle frequently to lower power multiplier inputs and/or minimizes the number of times a signal changes value; thereby, optimizing the power used by the integrated circuit.

Generally, a change in a signal/bit is referred to herein as a toggle in the signal/bit. In addition, the number of toggles in a signal/bit is referred to herein as the toggle rate/frequency. According to various embodiments of the present invention, a signal is defined by a series of bits where a change between sequential bits represents a toggle. For example, a signal of (1, 0, 0, 1, 1, 0) has a toggle rate/frequency of three whereas a signal of (1, 1, 0, 0, 1, 1) has a toggle rate/frequency of two. Aspects of the present invention recognize that a toggle in the signal can affect the resulting power consumption of the circuit component handling the signal. Further, the resulting power consumption could be higher depending on how signals are received/handled by the circuit component.

As mentioned earlier, one of the optimization techniques is to assign signals that toggle frequently to lower power component inputs in the circuit. For example, nets that toggle frequently are assigned to lower power routing resources and LUT inputs. Although this technique is applicable to various circuit components, it is particularly applicable to multipliers. Conventional wisdom suggests that a toggle on any of the inputs of a multiplier uses the same amount of power. However, as will be described below, attaching high toggling nets to different multiplier inputs can change the power consumed by the multiplier. In addition, other optimization techniques will be described that are specific to multipliers.

It will be appreciated by those skilled in the art that by reducing the power consumed by integrated circuits, circuit designers can put more logic in smaller packages while reducing the cost and size of cooling solutions needed to dissipate the heat. Also, portable applications can achieve longer battery life and/or save space by using smaller batteries. Since multipliers are common circuit elements, especially for digital signal processing, the power savings can be significant. Further, the power savings achieved by various aspects of the present invention do not sacrifice speed or area and can be easily measured.

To begin, FIG. 1 illustrates a block diagram 100 of a circuit component that can utilize various aspects of the present invention. For example, as shown in FIG. 1, X and Y are input signals 102 connected to ports 104 (i.e., A and B) of multiplier 101. The multiplier inputs are functionally identical in generating output 106. That is, due to the commutative property (i.e., X×Y=Y×X), multiplier 101 generates output 106 irrespective of which one of input signals 102 is connected to which one of the two input ports 104. It should be noted, however, that the two input ports could be different with respect to power. That is, the two input ports may have a different power consumption rating. In other words, if one bit of X changes (i.e., toggle), the power consumed by the multiplier is different depending on which input port the input signal X is connected to. A reason for the power difference is due at least in part to the hardware implementation of the multiplier.

According to one embodiment, multiplier 101 is a Booth recoding multiplier. This type of multiplier is commonly used because of its area/speed advantages over other multiplier implementations. Due to the implementation of the Booth recoding, toggling one bit of an input signal connected to port A may cause fewer internal multiplier signals to toggle than if one bit of an input signal connected to port B toggles. Because more bits toggle when the input signal connected to port B changes, more power is used. Therefore, port B can be referred to as the higher power port with the higher power consumption rating whereas port A can be referred to as the lower power port with the lower power consumption rating. However, this situation could be reversed depending on how the Booth multiplier is implemented. Since the power can be different depending on which input signal is connected to which port, several optimization techniques of the present invention can be performed to optimize the power consumed by the multiplier.

It will be appreciated by those skilled in the art that the present invention may be applicable to any type of multiplier or any component that consumes a different amount of power for each port. In general, aspects of the invention describe how to reduce power consumed by circuit components whenever (a) the logical functionality of the component is symmetric with respect to its various inputs, and (b) the power consumed by the component is asymmetric with respect to its various inputs. Furthermore, the modification to a component's inputs may be to multiple (e.g., two) logically distinct groups of inputs (e.g. multiplicand and multiplier inputs to a multiplier, or DATAA and DATAB inputs to a lookup-table logic element), or the modification may be only within a single logical bus of inputs to a single logical input port on the component (e.g. permutation of the address bits on a RAM). Further, some of the optimizations techniques of the present invention rely on other properties of hardware multipliers and will benefit all multipliers regardless of the implementation. As will be described below, various optimization techniques are provided that take advantage of one port using less power than the other.

Power Reduction and Toggle Rate

Figure 2:
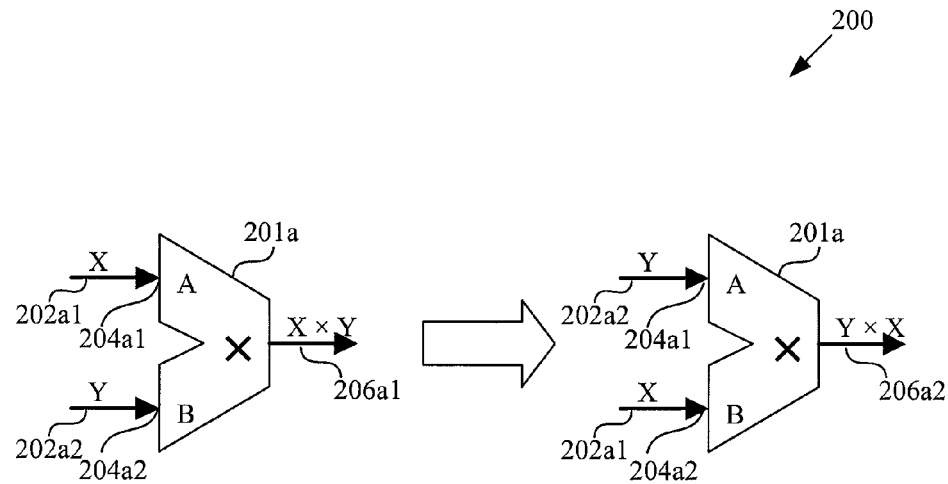
FIG. 2 illustrates a block diagram of optimizing power associated with a circuit component according to various embodiments of the present invention.

FIG. 2 illustrates a block diagram of optimizing power associated with a circuit component according to various embodiments of the present invention. The optimization involves assigning/swapping input signals so that the input signal with the higher toggle rate is connected to the lower power port. For example, in reference to block diagram 200, the portion to the left side of the big arrow represents the original design whereas the portion to the right side of the big arrow represents the optimized design. As shown, there are two multi-bit inputs X (i.e., 202a1) and Y (i.e., 202a2) originally designed for connecting to ports A (i.e., 204a1) and B (i.e., 204a2) of multiplier 201a. In this example, the toggle rate for input Y is higher than the toggle rate for input X and the power consumption (e.g., power consumed per toggle) for port A is lower than for port B. Therefore, optimization assigns/swaps inputs X and Y such that input Y connects to port A (lower power port) and input X connects to port B (higher power port). It should be noted that outputs 206a1 and 206a2 are functionally equivalent (i.e., X×Y=Y×X).

The toggle rates of these signals can be provided by the user, estimated using a software algorithm, or determined through simulation. Further, the power consumption for each port can be similarly provided by the user, estimated using a software algorithm, or determined through taking measurements. A circuit expert can also determine power consumption. In general, if a toggle on one port uses more power than a toggle on the other port, then the input with the higher toggle rate should use the lower power port. For example, the signal with the highest total toggle rate for all its bits should be assigned to the lowest power port.

Power Reduction and Signal Width

Figure 3:
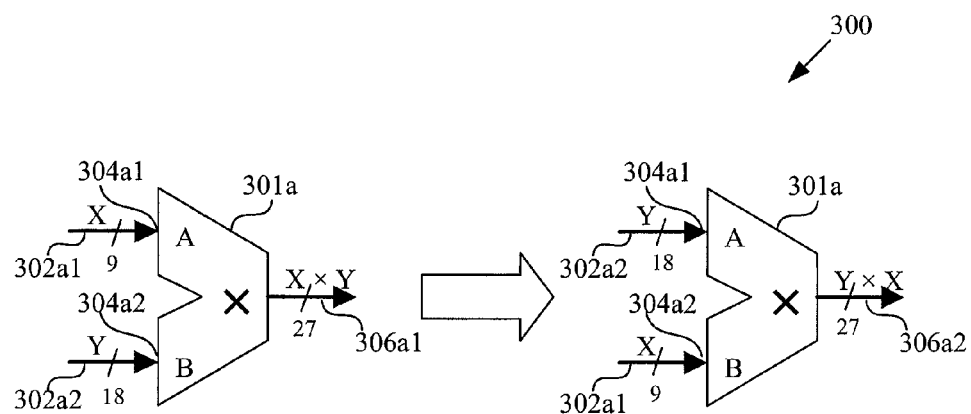
FIG. 3 illustrates another block diagram of optimizing power associated with a circuit component according to various embodiments of the present invention.

FIG. 3 illustrates another block diagram 300 of optimizing power associated with a circuit component according to various embodiments of the present invention. In general, the optimization involves swapping inputs so that the wider signal is connected to the lower power port. This optimization technique is useful if the toggle rates are unknown. In this case, it can be assumed that the toggle rate of each bit is the same. If inputs X and Y have the same number of bits then there may be no advantage to swapping the inputs. However, if X and Y have a different number of bits, then the wider signal should be assigned to the lower power input port.

For example, in FIG. 3, input X (i.e., 302a1) is 9 bits wide and input Y (i.e., 302a2) is 18 bits wide. In the original design (left side of the big arrow in FIG. 3), inputs X and Y are originally assigned for respectively connecting to port A (i.e., 304a1) and port B (i.e., 304a2) of multiplier 301a. If the toggle rates are unknown, then inputs X and Y are swapped in generating the optimized design (right side of the big arrow in FIG. 3) so that input Y is connected to the lower power port (port A in this case). It should be noted that outputs 306a1 and 306a2 are functionally equivalent. However, the optimization technique disclosed in reference to FIG. 2 should take precedence over this optimization technique since the sum of the toggle rates for input Y may still be less than that of input X.

In addition, if the multiply operation does not use all the bits of the hardware multiplier, then the multiply operation should use the higher bits of the hardware multiplier and the lower bits should be set to zero. This saves power because if the multiply was implemented in the lower bits, then the higher bits of the outputs would toggle and consume power when using signed multiplication even though they are not needed.

Power Reduction and Large Multipliers

Figure 4A:
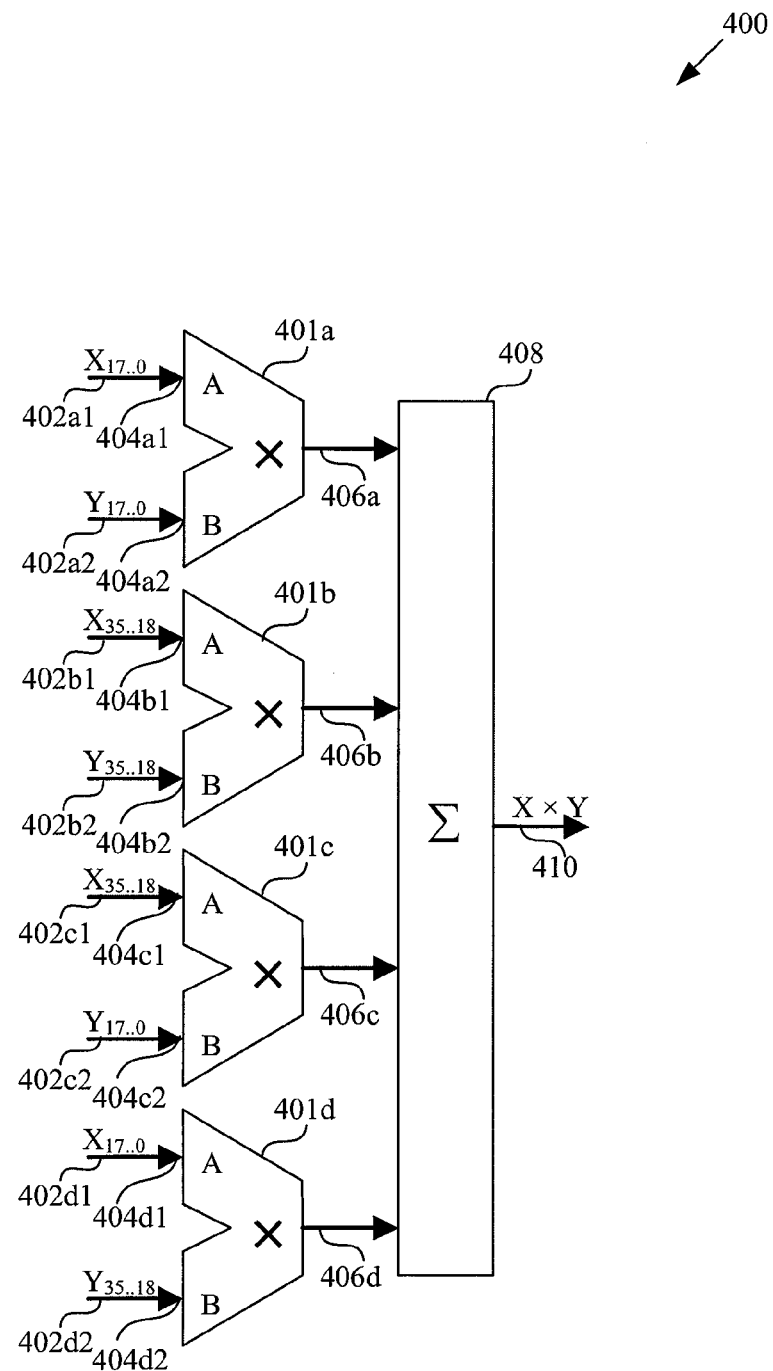
FIG. 4A illustrates a block diagram of a multiplier that can utilize various aspects of the present invention.

Various optimization techniques that involve a low power implementation of large multipliers will now be discussed. To begin, FIG. 4A illustrates a block diagram 400 of a multiplier that can utilize various aspects of the present invention. In some cases, circuits may contain multipliers whose inputs are wider than is supported by the FPGA hardware. This could also occur in ASICs if the cell library only supports certain sizes of multipliers. In these cases, optimization involves having each multiplier broken down into several smaller multipliers and their results are shifted and added together to get the final result. For example, if inputs X and Y are each 36 bits wide but the multipliers available only support 18-bit wide numbers, then the multiplication can be expanded as follows:

$$X \times Y = (X_{35\ldots18} \times 2^{18} + X_{17\ldots0}) \times (Y_{35\ldots18} \times 2^{18} + Y_{17\ldots0}) = X_{35\ldots18} \times Y_{35\ldots18} \times 2^{18} \times 2^{18} + X_{35\ldots18} \times Y_{17\ldots0} \times 2^{18} + X_{17\ldots0} \times Y_{35\ldots18} \times 2^{18} + X_{17\ldots0} \times Y_{17\ldots0}$$

The implementation of this equation is shown in FIG. 4A. The $2^{18}$ factor shifts the bits left by 18 bits so it is implemented by connecting the signals to the higher order inputs of the summation block. As shown in FIG. 4A, inputs X 402(a1, b1, c1, d1) and Y 402(a2, b2, c2, d2) are respectively connected to ports A 404(a1, b1, c1, d1) and B 404(a2, b2, c2, d2) of respective multipliers 401(a-d) in generating respective outputs 406(a-d), which are added together in a summation block 408 in generating a resulting X×Y output 410. The optimizations described in FIG. 2 can be applied individually to each of the multipliers in FIG. 4A. For example, if one input has a higher toggle rate than the other then it should be connected to the lower power port.

Figure 4B:
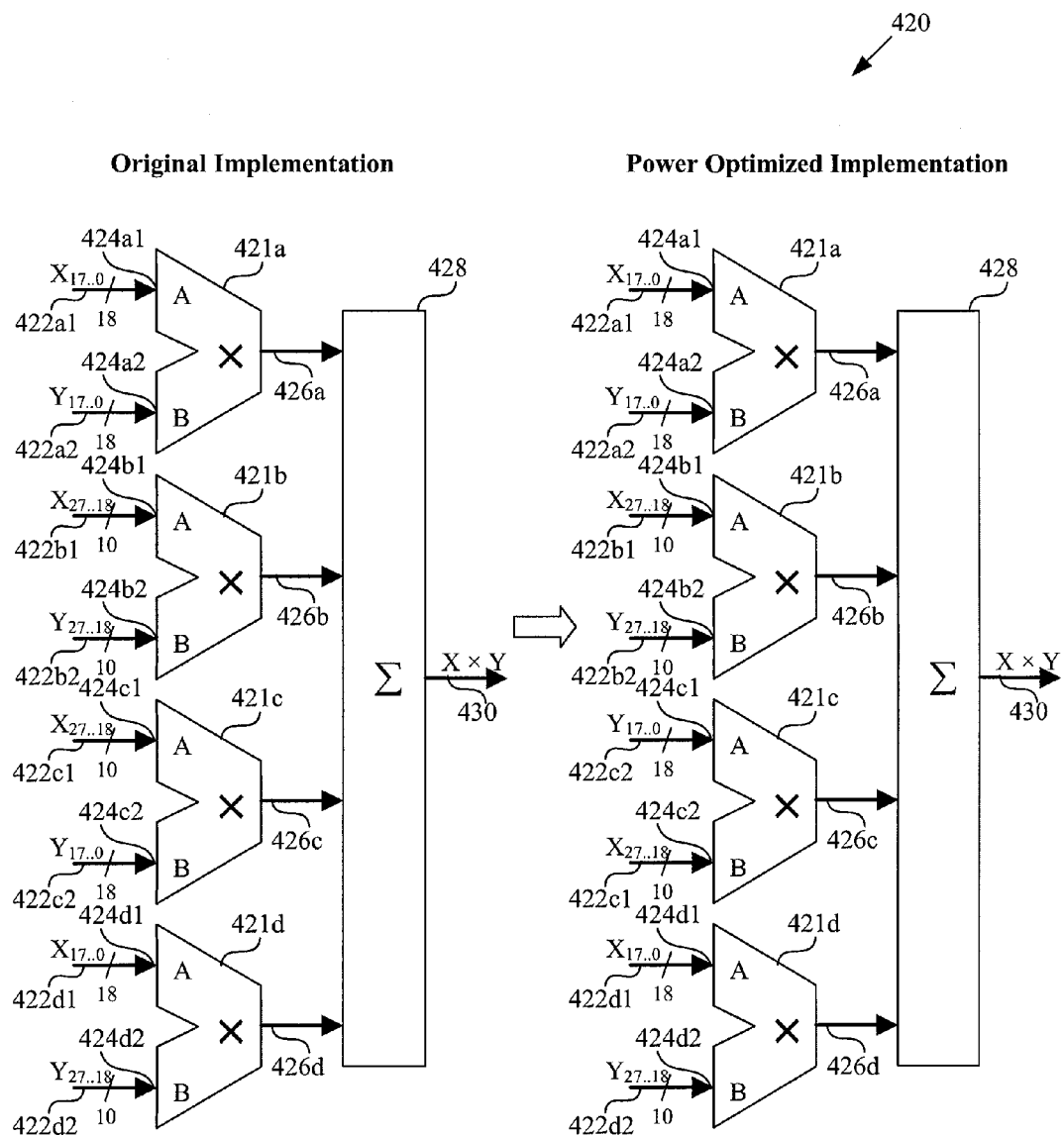
FIG. 4B illustrates a block diagram of optimizing power associated with a multiplier according to various embodiments of the present invention.

It should be noted that the width of a large multiplier does not have to a multiple of the hardware multiplier. For example, FIG. 4B illustrates a block diagram 420 of optimizing power associated with a multiplier according to various embodiments of the present invention. The multiplication of two 28-bit numbers using multipliers that support up to 18-bit wide numbers can be implemented as follows:

$$X \times Y = (X_{27\ldots 18} \times 2^{18} + X_{17\ldots 0}) \times (Y_{27\ldots 18} \times 2^{18} + Y_{17\ldots 0}) = X_{27\ldots 18} \times Y_{27\ldots 18} \times 2^{18} \times 2^{18} + X_{27\ldots 18} \times Y_{17\ldots 0} \times 2^{18} + X_{17\ldots 0} \times Y_{27\ldots 18} \times 2^{18} + X_{17\ldots 0} \times Y_{17\ldots 0}$$

$X_{17\ldots 0}$ and $Y_{17\ldots 0}$ have 18 bits each while $X_{27\ldots 18}$ and $Y_{27\ldots 18}$ have 10 bits each. Referring to FIG. 4B under the original implementation heading, inputs X 422($a1$, $b1$, $c1$, $d1$) and Y 422($a2$, $b2$, $c2$, $d2$) are respectively connected to ports A 424($a1$, $b1$, $c1$, $d1$) and B 424($a2$, $b2$, $c2$, $d2$) of respective multipliers 421($a$-$d$) in generating respective outputs 426($a$-$d$), which are added together in a summation block 428 in generating a resulting X×Y output 430. The widths of the multipliers are 18×18 (input 422$a1$ and input 422$a2$ into multiplier 421$a$), 10×10 (input 422$b1$ and input 422$b2$ into multiplier 421$b$), 10×18 (input 422$c1$ and input 422$c2$ into multiplier 421$c$), and 18×10 (input 422$d1$ and input 422$d2$ into multiplier 421$d$). Any of the optimizations described in FIGS. 2 and 3 can be used to optimize the power consumption of the multipliers. For example, if the toggle rates of the inputs are unknown and port A is the lower power port, then the optimization described in reference to FIG. 3 may be performed. That is, by swapping input 422$c1$ and input 422$c2$ into multiplier 421$c$, the 10×18 multiplier 421$c$ can be implemented as 18×10 to reduce the power (as shown in FIG. 4B under the power optimized implementation heading).

It will be appreciated by those skilled in the art that the present invention will also apply to numerous other ways in which to decompose a very wide multiplier into a set of smaller multipliers with associated summation circuitry. For example, the multiplication of two 28-bit numbers may equivalently be decomposed as follows:

$$X \times Y = (X_{27\ldots 10} \times 2^{10} + X_{9\ldots 0}) \times (Y_{27\ldots 10} \times 2^{10} + Y_{9\ldots 0}) = X_{27\ldots 10} \times Y_{27\ldots 10} \times 2^{10} \times 2^{10} + X_{27\ldots 10} \times Y_{9\ldots 0} \times 2^{10} + X_{9\ldots 0} \times Y_{27\ldots 10} \times 2^{10} + X_{9\ldots 0} \times Y_{9\ldots 0}$$

In this decomposition of the wide multiply, the most significant bits of each operand are grouped together in the wider part of each operand, rather than the narrower part as in the previous paragraphs. Any optimizations which applied to the decomposition outlined in the previous paragraphs will equally apply to this and other decompositions of the wide multiply.

When the widths of the inputs are not equal, the smaller width input can be attached to the higher power input port to save power. Therefore, if possible, all large multiplies should be broken down into smaller multiplies with unequal widths. Further, more power is saved when the widths of the inputs differ by a larger amount.

Figure 4C:
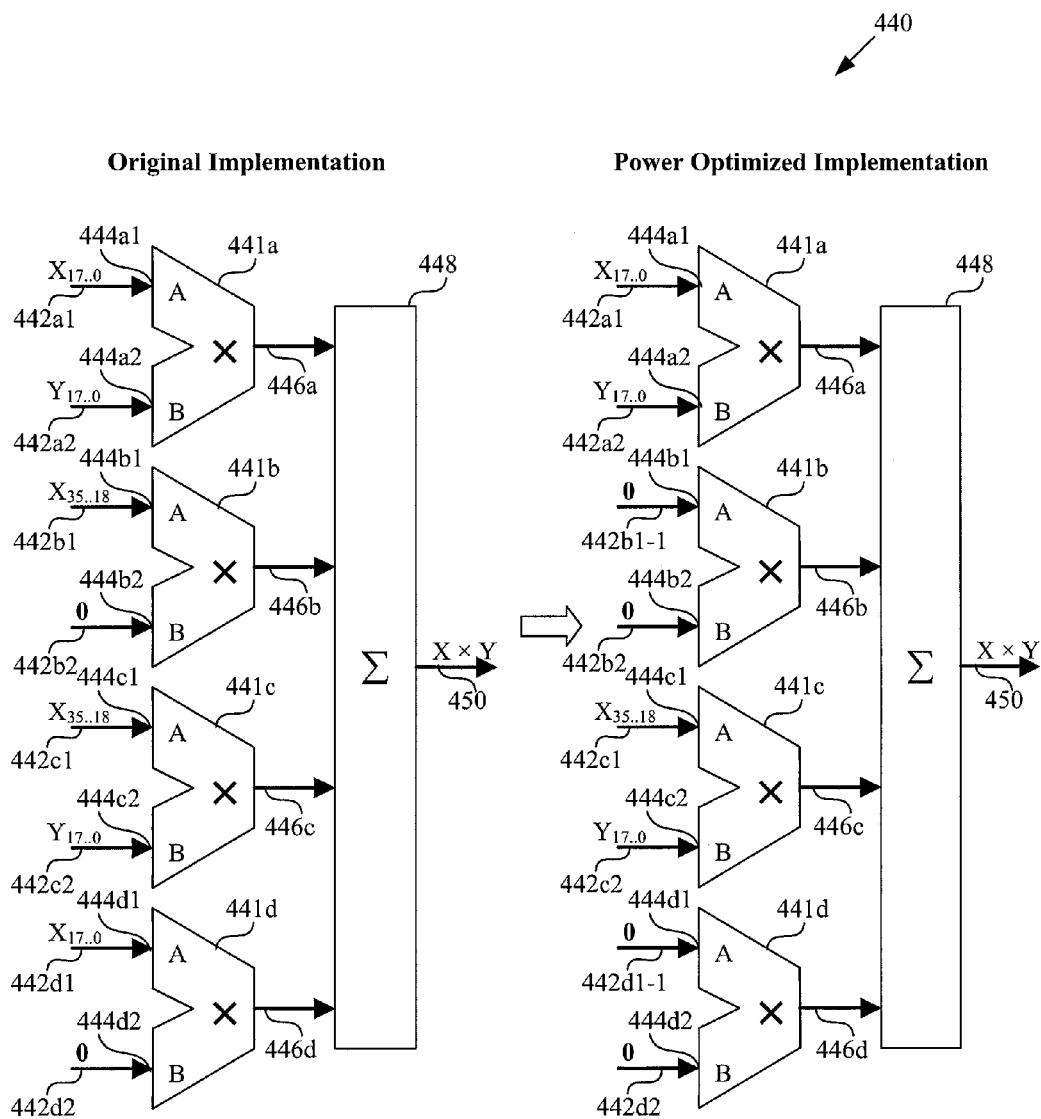
FIG. 4C illustrates another block diagram of optimizing power associated with a multiplier according to various embodiments of the present invention.

It should also be noted that the widths of the inputs to the large multiply do not have to be the same either. When the input widths are different, it may even be possible to reduce the number of multipliers used. For example, FIG. 4C illustrates another block diagram 440 of optimizing power associated with a multiplier according to various embodiments of the present invention. In this example, input X is 36 bits wide and input Y is 18 bits wide. The multiplication of inputs X and Y can be implemented as follows:

$$X \times Y = (X_{35\ldots 18} \times 2^{18} + X_{17\ldots 0}) \times Y_{17\ldots 0} = X_{35\ldots 18} \times Y_{17\ldots 0} \times 2^{18} + X_{17\ldots 0} \times Y_{17\ldots 0}$$

Referring to FIG. 4C under the original implementation heading, inputs 442($a1$, $b1$, $c1$, $d1$) and 442($a2$, $b2$, $c2$, $d2$) are respectively connected to ports A 444($a1$, $b1$, $c1$, $d1$) and B 444($a2$, $b2$, $c2$, $d2$) of respective multipliers 441($a$-$d$) in generating respective outputs 446($a$-$d$), which are added together in a summation block 448 in generating a resulting X×Y output 450. The original implementation in FIG. 4C shows that two of the multipliers (i.e., 441$b$ and 441$d$) in a standard 36-bit multiplication have inputs (i.e., 442$b2$ and 442$d2$) that are driven by zero. The other terms (i.e., 442$b1$ and 442$d1$) in those multipliers are toggling, but the outputs (i.e., 446$b$ and 446$d$) of those multipliers are always zero. The toggling inputs cause the multipliers to use some power even though the outputs are not changing. Also, routing is required to connect the signals to the multipliers. This routing will use unnecessary resources and power. Therefore, the power optimized implementation removes the signals (i.e., 442$b1$ and 442$d1$) that have no effect on the result and connects the multiplier inputs to zero (i.e., 442$b1$-1 and 442$d1$-1). As such, none of inputs of the unused multipliers toggle, thereby, saving power.

Figure 4D:
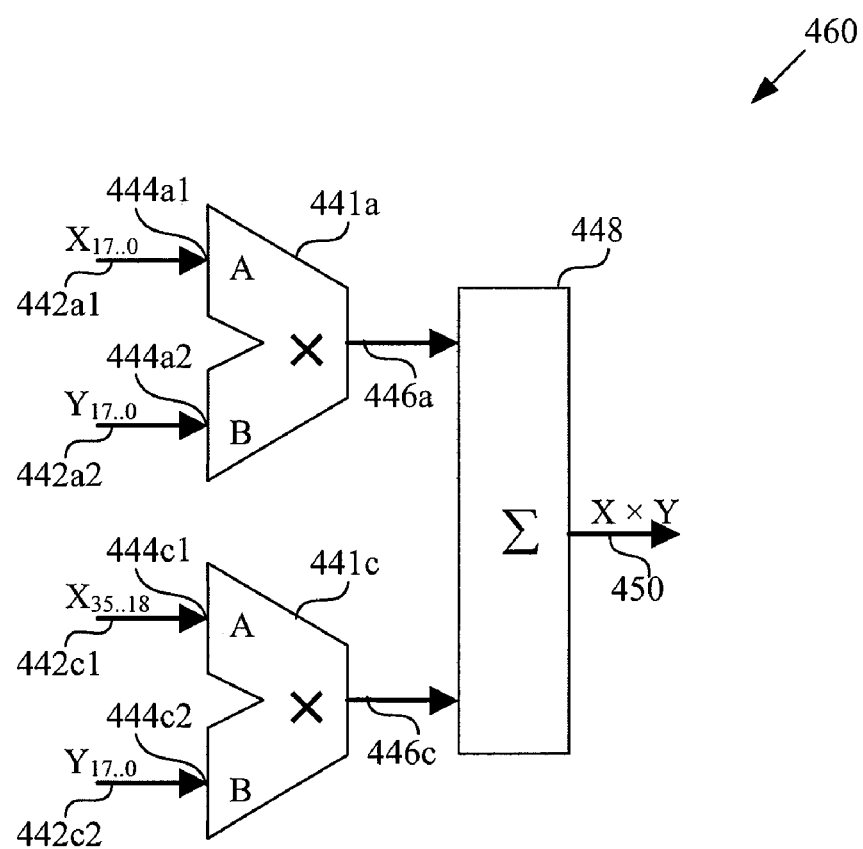
FIG. 4D illustrates another block diagram of optimizing power associated with a multiplier according to various embodiments of the present invention.

In some cases, the hardware may be hardwired to implement large multipliers with four small multipliers and some adder circuitry. In this case, it may not be possible to remove the unused multipliers from the circuit. For example, some FPGAs have a 36-bit multiplier block that contains four multipliers and a summation block. These five components must be used together so it is not possible to remove the unused multipliers if the 36-bit multiplication hardware is used. Nevertheless, power can still be saved by wiring all the inputs to the unnecessary multipliers to zero instead of X and Y. This saves power because those inputs will not toggle and it also saves routing resources. On the other hand, some FPGAs do not have hardware for 36-bit multiplication but they do have hardware for 18-bit multiplication. As such, the 36 by 18-bit multiplication can be implemented with separate 18-bit multipliers and summation circuitry. In this case, the unused multipliers can be removed as illustrated in block diagram 460 of FIG. 4D.

Power Reduction with Pipeline Registers

Figure 9:
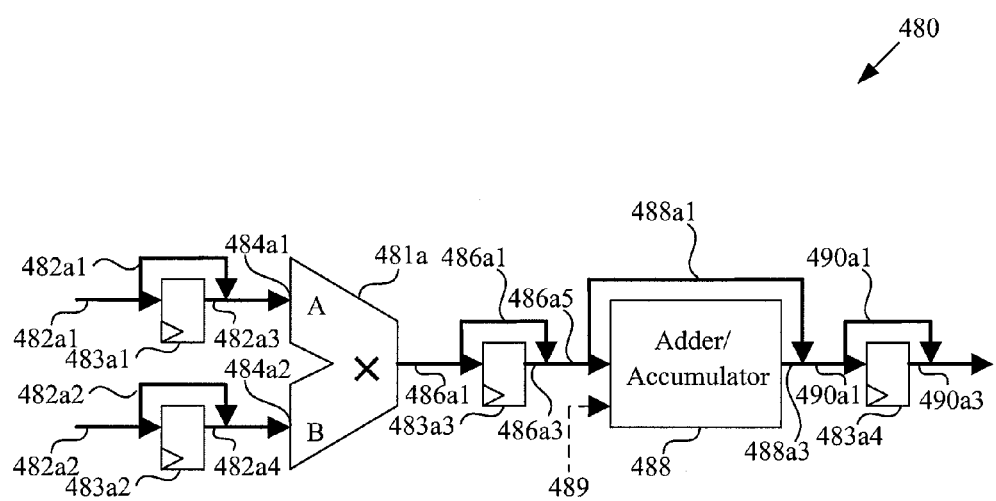
FIG. 9 illustrates another block diagram of optimizing power associated with a multiplier according to various embodiments of the present invention.

FIG. 9 illustrates another block diagram 480 of optimizing power associated with a multiplier according to various embodiments of the present invention. In general, the optimization involves a low power implementation of pipelined multipliers. As shown, FIG. 9 includes a multiplier 481$a$ with pipeline registers 483($a1$-$a4$) and an adder/accumulator block 488. Multiplier 481$a$ includes port A 484$a1$ and port B 484$a2$ for receiving inputs for multiplication. Adder/accumulator block 488 is operable to add any number of individual multiplication results (e.g., 486$a5$, 489) via its inputs and generate a corresponding output.

Multipliers are often pipelined with registers so that they can run at higher clock frequencies. Multipliers are also often followed by an adder or accumulator, which is common in DSP applications. Each register has a corresponding input signal (e.g., 482$a1$, 482$a2$, 486$a1$, 490$a1$) and output signal (e.g., 482$a3$, 482$a4$, 486$a3$, 490$a3$). However, the use of the registers and the adder/accumulator is optional. The hardware can be bypassed by selecting the appropriate signal (482$a1$ vs. 482$a3$; 482$a2$ vs. 482$a4$; 486$a1$ vs. 486$a3$; 488$a1$ vs.

488a3; 490a1 vs. 490a3) with a multiplexer. The different signal paths are shown in FIG. 9. In an ASIC, these blocks can be added or removed from the netlist.

A circuit design typically specifies which registers are used, but software algorithms can be used to move the registers forward or backward in the datapath to meet the timing requirements. Since aspects of the present invention recognize that the choice of registers affects power consumption, the algorithm can also be used to balance the timing requirements with the power consumption. If the timing requirements for the multiplier are flexible, then the algorithm can choose which registers are used to reduce the power of the multiplier.

Prior literature has discussed the impact on power of adding or removing pipeline registers in a circuit: e.g., S. J. E. Wilton, S-S. Ang, W. Luk, "The Impact of Pipelining on Energy per Operation in Field-Programmable Gate Arrays", in *International Conference on Field-Programmable Logic and its Applications*, Antwerp, Belgium, August 2004, which is included in Lecture Notes in Computer Science 3203, Springer-Verlag, pp. 719-728, and which are hereby incorporated by reference. However the prior literature does not describe preferred locations of those registers. In particular, aspects of the present invention recommend that registers be placed as early as possible in a multiplier datapath, with greatest preference being at the direct input to the multipliers.

Registering the signals can filter out glitches that occur between clock edges. The signal may change multiple times per clock cycle but the register's output will only change once when the register latches the signal. In addition, registering the signal causes all of its bits to change at essentially the same time. Because of differing logic delays, the inputs to the register may change at different times. However it is important to note that the register can synchronize these changes and that the downstream logic uses less power when the signals change closer together.

Therefore, in order to optimize power in the circuit, it would be beneficial to register the signals earlier in the multiplier's datapath especially if the signals are prone to glitches or arrive at different times. That is, the registers should be as close to the front of the multiplier as is allowed by the timing requirements to minimize downstream glitches and differences in the arrival times. In order to maintain equivalent functionality, this optimization may require that registers be moved from other parts of the circuit netlist toward the immediate inputs of the multiplier component. In particular, the optimization may require that registers be moved through other logic, either forward or backward in the circuit's data flow; this process is called register retiming. The restrictions and mechanics involved in performing register retiming on a circuit netlist are well known.

It is important to note that aspects of the present invention can be applied to a circuit component having a plurality of ports, one port with multiple bits or, in the case of glitch filtering, a single bit. It is also important to note that signals may change their values at different times and/or multiple times within the same clock cycle. Therefore, according to various embodiments of the present invention, adding registers means that the outputs of the registers will toggle at substantially the same time and only once per clock cycle.

Power Reduction with Ram Block

As mentioned earlier, the above optimization techniques could be generalized to circuit components other than multipliers. In general, if any circuit component block has two inputs that are logically/functionally equivalent, but a toggle of one input causes more power consumption than a toggle of the other, then the input that toggles more frequently should be connected to the lower power port. As indicated previously, this permutation of inputs may be within a single multi-bit logical bus of inputs, or it may be across two or more distinct logical ports. If the toggle rates are unknown and the inputs are multi-bit then the wider input should be connected to the lower power port. Also, any circuit with glitches or unbalanced signal arrival times could reduce power by registering the signal early and/or often in the datapath.

Figure 5A:
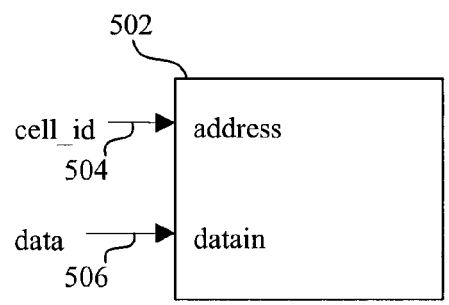
FIG. 5A illustrates a block diagram of a RAM block that can utilize various aspects of the present invention.
Figure 5A:
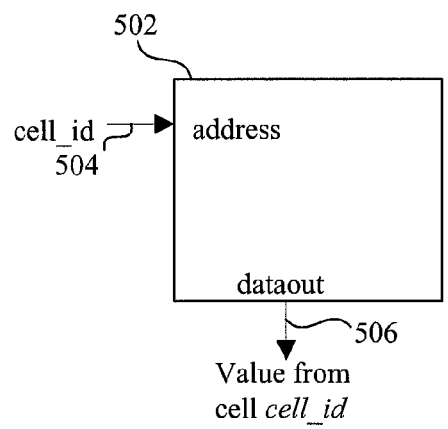

An example where the above optimization techniques could be generalized to circuit components other than multipliers involves the address lines of a RAM block. FIG. 5A illustrates a block diagram of a RAM block that can utilize various aspects of the present invention. A RAM block stores data as a numbered sequence of data words. RAM blocks may be configured to have various widths and depths. The depth of a RAM specifies the number of data words stored in the RAM, and is usually a power of 2, e.g., $2^k$. The data words are numbered 0 through $2^k-1$, thus, the RAM uses k address bits. The width of a RAM specifies how many bits comprise a single addressable data word, and in theory could be any positive number (typically 1, 8, 9, 16, 18 and so on).

To write a value to a particular data word in RAM 502, the value 506 is presented to the DATAIN input port of the RAM, and the address 504 of the cell is presented to the ADDRESS input port of the RAM. After possibly some clock cycles of latency, the value will be stored in that particular cell. To read the value of a particular data word from the RAM, the address 504 of that data word is presented to the ADDRESS port of the RAM 502, and (after possibly some clock cycles of latency) the value 506 stored in that cell will appear on the DATAOUT output port of the RAM. As will be described below, there are symmetries in the functionality of the RAM block both in the addresses, and in the data words.

In pseudo-code, the write operation MYRAM.WRITE (cell_id,data) works like this:
MYRAM.ADDRESS←cell_id, and
MYRAM.DATA_IN←data
Then the cell at address cell_id gets the value data,
i.e.: MYRAM[cell_id]:=data
Similarly, the read operation MYRAM.READ(cell_id) works like this:
MYRAM.ADDRESS←cell_id
Then the DATAOUT port will have the value currently stored at cell_id
i.e.: MYRAM.DATAOUT will have value MYRAM[cell_id]

This describes the basic functionality of a single port RAM. Other variations are possible and common, e.g. simple dual port, bidirectional dual port, but the optimization techniques of the present invention applies to them in substantially the same way. For example, the optimization technique described in FIG. 2 can be applied to the address lines of a RAM block. If a toggle of one of the address bits causes less power to be consumed then a toggle of another address bit then the most frequent toggling address bit should be connected to the lowest power address bit input.

The general technique is now described. First, suppose a processing block has functionally equivalent input ports. That is, the block will produce equivalent outputs even though it is possible to swap or permute its data inputs. The block can be referred to as "symmetric" with regards to those inputs. Next, suppose that toggling the input to one of those symmetric input ports (a "high energy port") causes more energy to be consumed than some other of those symmetric input ports. Also, suppose that the average toggle rates for various inputs to the blocks (via explicit assignment, simulation, or other methods) can be determined. Then, optimizing the power consumption of the block involves permuting the inputs on symmetric input ports on the block so that the highest toggling signals drive the lowest energy block inputs. In reference to FIG. 2, this general technique was applied by observing that the A and B ports on a multiplier are symmetric or permutable with respect to each other, and describing how the X and Y inputs may be swapped so that the highest toggling input (either X or Y) drives the lowest energy block input (port A in FIG. 2).

Figure 5B:
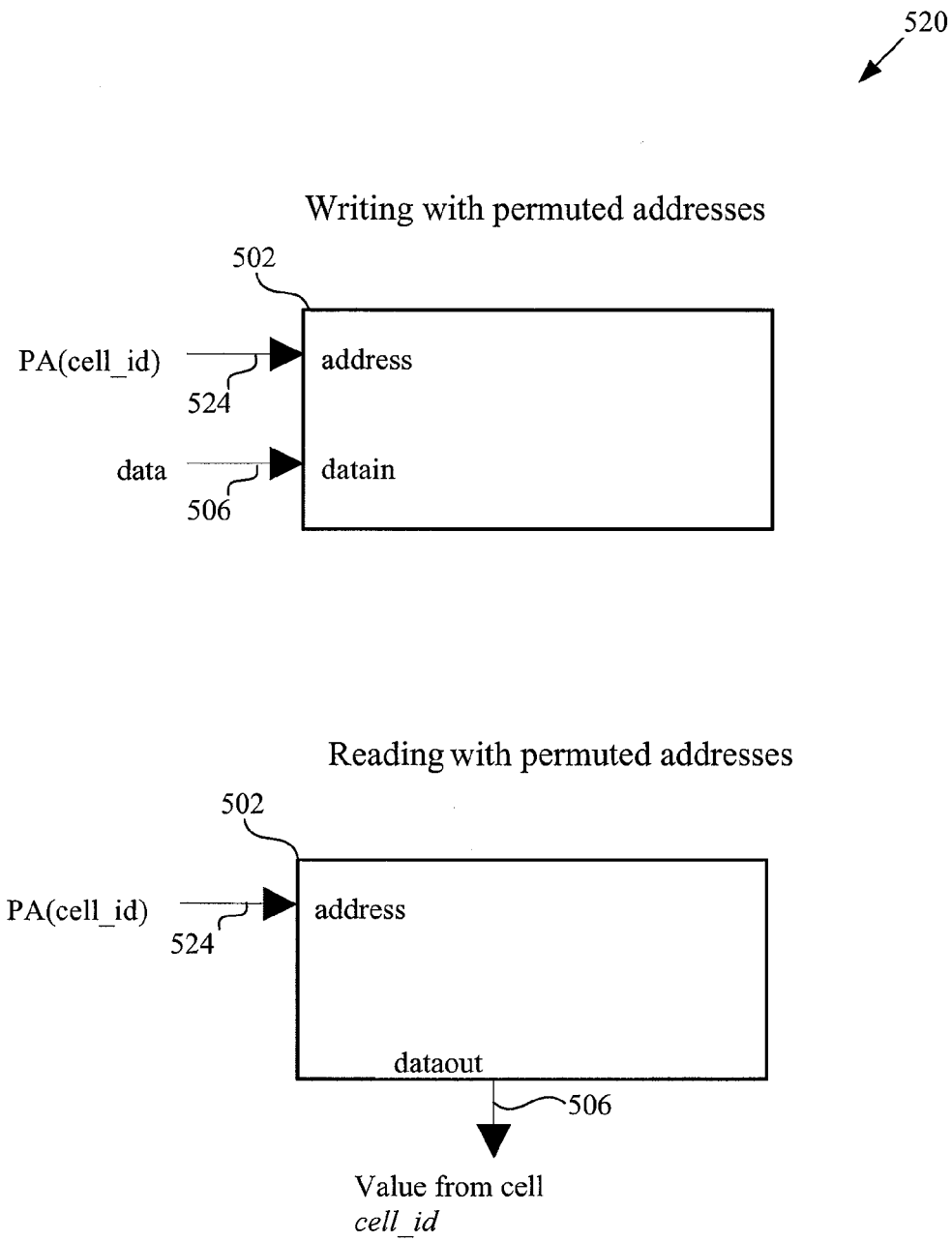
FIG. 5B illustrates a block diagram of optimizing power associated with a RAM block according to various embodiments of the present invention.

FIG. 5B illustrates a block diagram 520 of optimizing power associated with a RAM block having RAM address symmetry according to various embodiments of the present invention. The optimization technique involves permuting the RAM addresses. The RAM addresses may be permuted at will, as long as the write addresses and read addresses are remapped using the same permutation. That is, suppose PA is a permutation of the addresses $[0 \ldots 2^k-1]$ (e.g., PA (cell_id) 524). Now suppose there is a sequence of reads and writes using addresses $cell_0$, $cell_1$, $cell_2$, $cell_3$, and so on. Then that sequence of reads and writes on the RAM 502 will have the same result as if addresses $PA(cell_0)$, $PA(cell_1)$, $PA(cell_2)$, $PA(cell_3)$ and so on were instead used. Schematically, with reference to the pseudo-code above, the following substitution can be implemented: MYRAM.WRITE.(writecell, data) and MYRAM.READ(readcell) in the original sequence is substituted with MYWRAM.WRITE(PA(writecell),data) and MYRAM.READ(PA(readcell)). As long as reading and writing use the same address permutation PA, the outputs from the RAM will be the same as in the original case described in FIG. 5A.

Figure 5C:
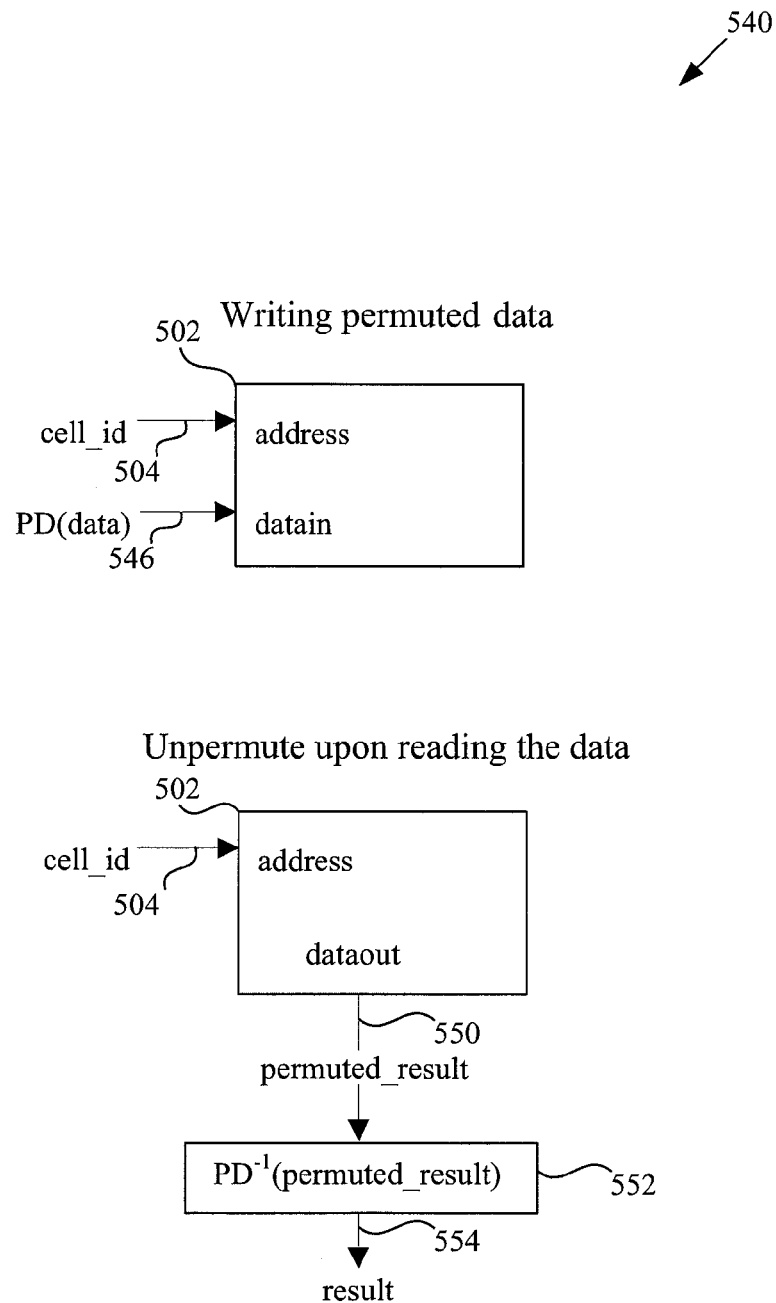
FIG. 5C illustrates another block diagram of optimizing power associated with a RAM block according to various embodiments of the present invention.

FIG. 5C illustrates another block diagram 540 of optimizing power associated with a RAM block having RAM data symmetry according to various embodiments of the present invention. The bits in the data words may be permuted at will, as long as the permutation applied on reading the data is inverse to the permutation applied on writing the data.

Suppose PD is a permutation of the data word bit positions $\{0, 1, 2, \ldots, \text{width}-1\}$, and $PD^{-1}$ is its inverse permutation (that is $PD^{-1}(PD(i))=i$). Also, suppose the notation dataword [i] to be bit i of the data word. Then it is possible to express a word of data both as a group and as an ordered sequence of bits, i.e. dataword={dataword[0], dataword[1], ..., dataword[width−1]}. Then it is also possible to define the application of permutation PD as follows: PD(dataword)={dataword[PD(0)], dataword[PD(1)], ..., dataword[PD(width−1)]}. That is, PD(dataword) is just the value dataword but with its bits permuted by position according to PD.

Schematically, with reference to the pseudo-code above, the following substitution can be implemented: MYRAM.WRITE.(writecell, data) and MYRAM.READ(readcell) in the original sequence of operations is substituted with MYRAM.WRITE(writecell, PD(data)) and $PD^{-1}$(MYRAM.READ(readcell)). That is, "permute" the values (e.g., 546) going into the RAM core, and "un-permute" them coming out (e.g., un-permute the permuted result 550 with an inverse mechanism 552 to get result 554, which is equivalent to 506 in FIG. 5A). Downstream logic uses $PD^{-1}$(permuted_result), which is achieved by simply changing routing.

Aspects of the present invention involve exploiting RAM address and data symmetry. Suppose power models indicate that the highest order bits of the RAM block hardware are the highest energy consumers, and that the highest order RAM address bits are the highest toggling. Then RAM address symmetry allows aspects of the present invention to permute the address bits of the RAM block so that the highest toggling address bits are routed to the lowest energy-consuming address bits on the RAM block. As long as this is done consistently between the read address and write address ports on the RAM block, the functionality of the RAM is preserved while the power consumption is lowered.

Further, suppose power models indicate that the highest order data input bit ports and data output bit ports are the highest energy consumers on the RAM block. Also, suppose the design of the user tends to make the highest order data bits very high toggling (in comparison to the lower order data bits). Then RAM data symmetry allows aspects of the present invention to swap the data bits on the input port around so the high toggling data bits appear on the lower energy consuming data input bit ports on the RAM block, as long as the inverse transform is applied on the data output path.

Power Reduction with Look-Up-Table

Another example where the above optimization techniques could be generalized to circuits other than multipliers involves a look-up-table (LUT). Generally, FPGA logic is implemented in LUT blocks. A LUT block can be configured to compute any Boolean function over a small number of inputs. Typical FPGAs have LUTs with 4 to 6 inputs. For example, a single 4-input LUT can compute the following functions:

and(a,b,c,d)=the logical "and" of inputs a, b, c, d (it is 1 if all inputs are 1 and 0 otherwise)

xor(a, b)=the exclusive-or of a and b (it is 0 if a equals b, and 1 otherwise)

implies(u, v)=the implication operator (it is 0 if u is 1 and v is 0, and 1 otherwise)

Any Boolean function is defined by its truth table, which defines the result of the function under all possible inputs. For example, the lutmask for the implication operator is derived as shown in the truth table (Table 1) below.

TABLE 1

| u value | v value | Implies(u,v) value |
|---------|---------|--------------------|
| 0 | 0 | 1 |
| 0 | 1 | 1 |
| 1 | 0 | 0 |
| 1 | 1 | 1 |

A LUT is at least in part functionally equivalent to a small RAM by the following correspondences: a) the contents of the RAM are specified by the result column of the truth table for the function. In this case, the contents of the RAM are called the "lutmask"; b) the address bits of the RAM correspond to the inputs of the LUT; c) the (typically 1 bit) output of the RAM corresponds to the output of the LUT and hence the result of the function being implemented.

For example, the implies function can be implemented in a two-input LUT, which is similar to a read-only RAM having two address inputs. The inputs u and v of the LUT may correspond to the two address bits of the RAM. If u is taken as the more significant address bit, then v is the least significant address bit and the lutmask (the RAM contents) is equal to 1101 (reading from the truth table above). The lower order inputs to the LUT are the higher energy inputs. In other words, toggling the lower order inputs to the LUT tends to consume more power than toggling the higher order inputs. Of course, this may depend somewhat on the lutmask, but on average this is true.

Aspects of the RAM data symmetry principle as described with reference to FIG. 5C can be used to save power in LUTs in the following way: a) suppose the lower-order inputs to the LUT have higher toggle rates than the higher order inputs; b) then permute the inputs to the LUT, and perform the corresponding permutation on the lutmask bits.

Figure 6:
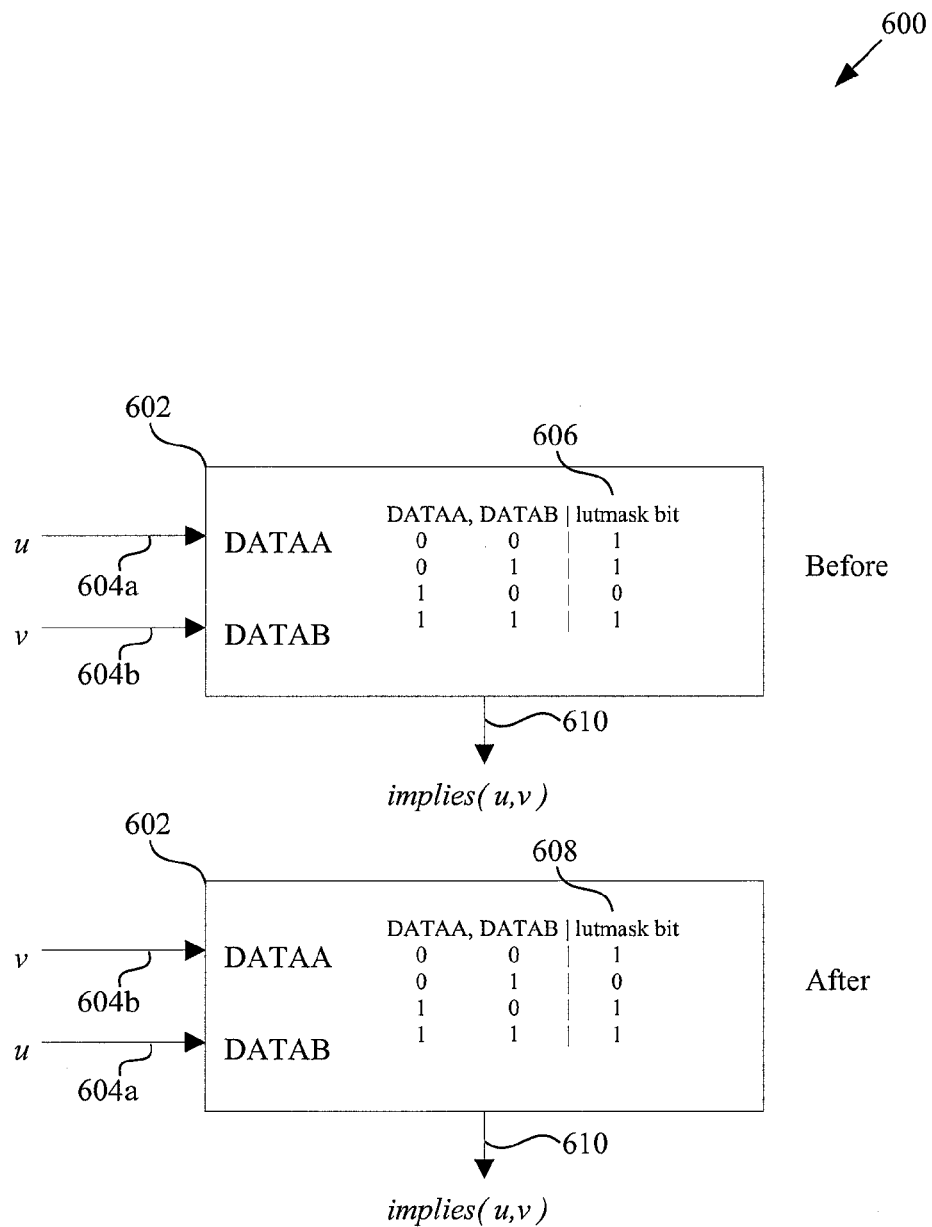
FIG. 6 illustrates a block diagram of optimizing power associated with a LUT according to various embodiments of the present invention.

To further elaborate, FIG. 6 illustrates a block diagram 600 of optimizing power associated with a LUT according to various embodiments of the present invention. In general, optimization involves permuting LUT inputs and lutmask to save power. FIG. 6 shows permuting the inputs for a 2-LUT implementing the implies function. For example, assume that DATAA is the higher energy input to the LUT and that input u 604a toggles more than input v 604b. Then, permuting the inputs u and v to the LUT 602 and permuting the lutmask 606 to lutmask 608 saves power. It is important to note that the transformed LUT still computes implies(u,v) 610.

Power Reduction with Other Components

It will be appreciated by those skilled in the art that the present invention may also be applied to other circuit components having symmetries with respect to their inputs. For example, the optimization will apply to barrel shifters, multiplexers, and crossbars. Each of these circuit components is symmetric in one or more of its inputs. In some cases the permutation of data bits within one set of inputs may only be applied in conjunction with permutation within data bits within a different set of inputs. For example, the select inputs to a multiplexer may be permuted as long as the data inputs to the multiplexer are also permuted in certain ways. This is similar to the restriction that the lutmask of a LUT must change whenever the inputs to the LUT are rotated.

Other Embodiments

Power reduction is an important goal for FPGAs, ASICs, and custom integrated circuits (ICs). Aspects of the present invention can reduce the power of all these classes of integrated circuits. Existing automated design tools can be modified to perform the optimizations (e.g., transformations, permutations, interconnections, etc.) detailed in this disclosure. Power is a critical issue for many users and the user will likely choose the tool that can implement their design with the least amount of power.

Figure 7:
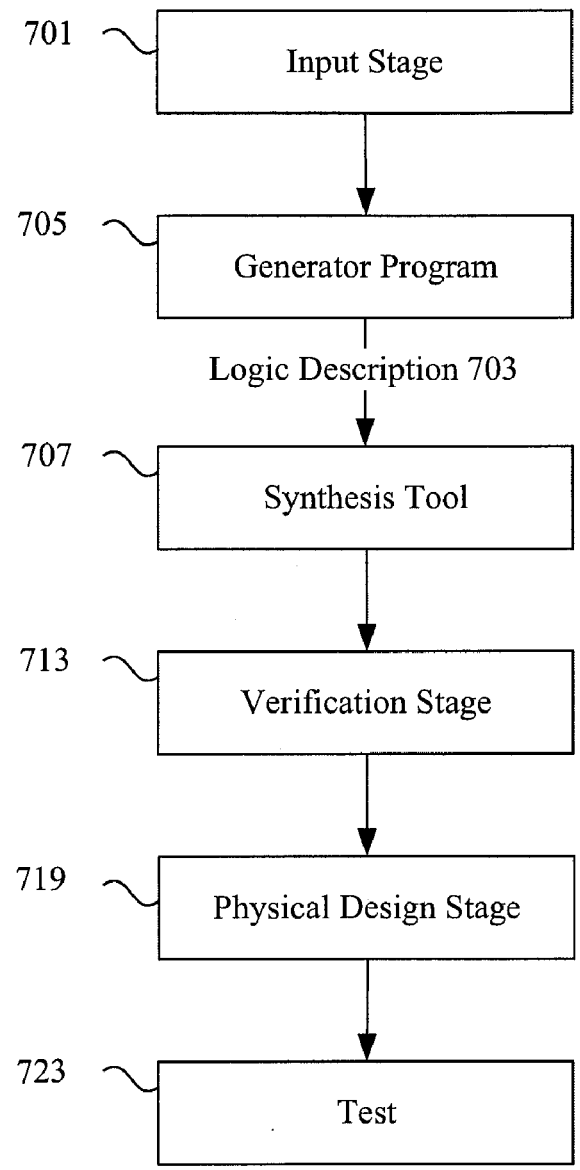
FIG. 7 is a diagrammatic representation showing implementation of a programmable chip.

For example, FIG. 7 is a diagrammatic representation showing implementation of an electronic device (e.g., programmable chip) using an electronic design automation tool (e.g., programmable chip tool) that incorporates the optimization techniques of the present invention. An input stage 701 receives selection information typically from a user for logic such as a processor core as well as other components such as a multiplier, LUT, logic gates, barrel shifters, multiplexers, crossbars, or RAM to be implemented on an electronic device. A generator program 705 creates a logic description and provides the logic description along with other customized logic to any of a variety of synthesis tools, place and route programs, and logic configuration tools to allow a logic description to be implemented in an electronic device.

In one example, an input stage 701 often allows selection and parameterization of components to be used on an electronic device. In some examples, components provided to an input stage include intellectual property functions, megafunctions, and intellectual property cores. The components may be stored and retrieved from a library or database. The input stage 701 may be a graphical user interface using wizards for allowing efficient or convenient entry of information. The input stage may also be a text interface or a program reading a data file such as a spreadsheet, database table, or schematic to acquire selection information. The input stage 701 produces an output containing information about the various components selected.

In typical implementations, the generator program 705 can identify the selections and generate a logic description with information for implementing the various components. The generator program 705 can be a Perl script creating HDL files such as Verilog, Abel, VHDL, and AHDL files from the module information entered by a user. According to various embodiments, the generator program 705 also provides information to a synthesis tool 707 to allow HDL files to be automatically synthesized. In some examples, a logic description is provided directly by a designer. The HDL files may contain technology specific code readable only by a synthesis tool. The HDL files at this point may also be passed to a simulation tool.

As will be appreciated by one of skill in the art, the input stage 701, generator program 705, and synthesis tool 707 can be separate programs. The interface between the separate programs can be a database file, a log, or simply messages transmitted between the programs. For example, instead of writing a file to storage, the input stage 701 can send messages directly to the generator program 705 to allow the generator program to create a logic description. Similarly, the generator program can provide information directly to the synthesis tool instead of writing HDL files. On the other hand, input stage 701, generator program 705, and synthesis tool 707 can be integrated into a single program.

For example, SOPC Builder tool available from Altera Corporation, San Jose, Calif. integrates different stages of the electronic device implementation into a single program while implementing various techniques and mechanisms of the present invention. In particular, SOPC Builder tool provides system-level design flows for SOPC architectures. SOPC Builder tool may automatically generate interconnect logic (e.g., Avalon™ switch fabric) connecting components used in SOPC applications. The components include embedded processors that may either be internal or external to the FPGA and peripherals.

A user may select various components and an integrated program can then take the user selections and output a logic description in the form of a synthesized netlist without intermediate files. Any mechanism for depicting the logic to be implemented on an electronic device is referred to herein as a logic description. According to various embodiments, a logic description is an HDL file such as a VHDL, Abel, AHDL, or Verilog file. A logic description may be in various stages of processing between the user selection of components and parameters to the final configuration of the device. According to other embodiments, a logic description is a synthesized netlist such as an Electronic Design Interchange Format Input File (EDF file). An EDF file is one example of a synthesized netlist file that can be output by the synthesis tool 707.

A synthesis tool 707 can take HDL files and output EDF files. Tools for synthesis allow the implementation of the logic design on an electronic device. Some of the available synthesis tools are Leonardo Spectrum, available from Mentor Graphics Corporation of Wilsonville, Oreg. and Synplify available from Synplicity Corporation of Sunnyvale, Calif. Various synthesized netlist formats will be appreciated by one of skill in the art.

A verification stage 713 typically follows the synthesis stage 707. The verification stage checks the accuracy of the design to ensure that an intermediate or final design realizes the expected requirements. A verification stage typically includes simulation tools and timing analysis tools. Tools for simulation allow the application of inputs and the observation of outputs without having to implement a physical device. Simulation tools provide designers with cost effective and efficient mechanisms for both functional and timing verification of a design. Functional verification involves the circuit's logical operation independent of timing considerations. Parameters such as gate delays are disregarded. It should be noted that the optimization techniques of the present invention can be implemented in various design stages/tools as described above. For example, the optimization techniques can be implemented in the verification stage 713. Further, the optimization techniques can be fully automated.

Timing verification involves the analysis of the design's operation with timing delays. Setup, hold, and other timing requirements for sequential devices such as flip-flops are confirmed. Some available simulation tools include Synopsys VCS, VSS, and Scirocco, available from Synopsys Corporation of Sunnyvale, Calif. and Cadence NC-Verilog and NC-VHDL available from Cadence Design Systems of San Jose, Calif. After the verification stage 713, the synthesized netlist file can be provided to physical design tools 719 including place and route and configuration tools. A place and route tool typically locates logic cells on specific logic elements of a target hardware device and connects wires between the inputs and outputs of the various logic elements in accordance with logic required to implement an electronic design. The device can also be physically tested at 723.

For programmable logic devices, a programmable logic configuration stage can take the output of the place and route tool to program the logic device with the user selected and parameterized components. According to various embodiments, the place and route tool and the logic configuration stage are provided in the Quartus Development Tool, available from Altera Corporation of San Jose, Calif.

As noted above, different stages and programs can be integrated in a variety of manners. According to one embodiment, the input stage 701, the generator program 705, the synthesis tool 707, the verification tools 713, and physical design tools 719 are integrated into a single program. The various stages are automatically run and transparent to a user. The program can receive the user-selected components, generate a logic description depicting logic for implementing the various selected components, and implement the electronic device. As will be appreciated by one of skill in the art, HDL files and EDF files are mere examples of a logic description. Other file formats as well as internal program representations are other examples of a logic description.

Figure 8:
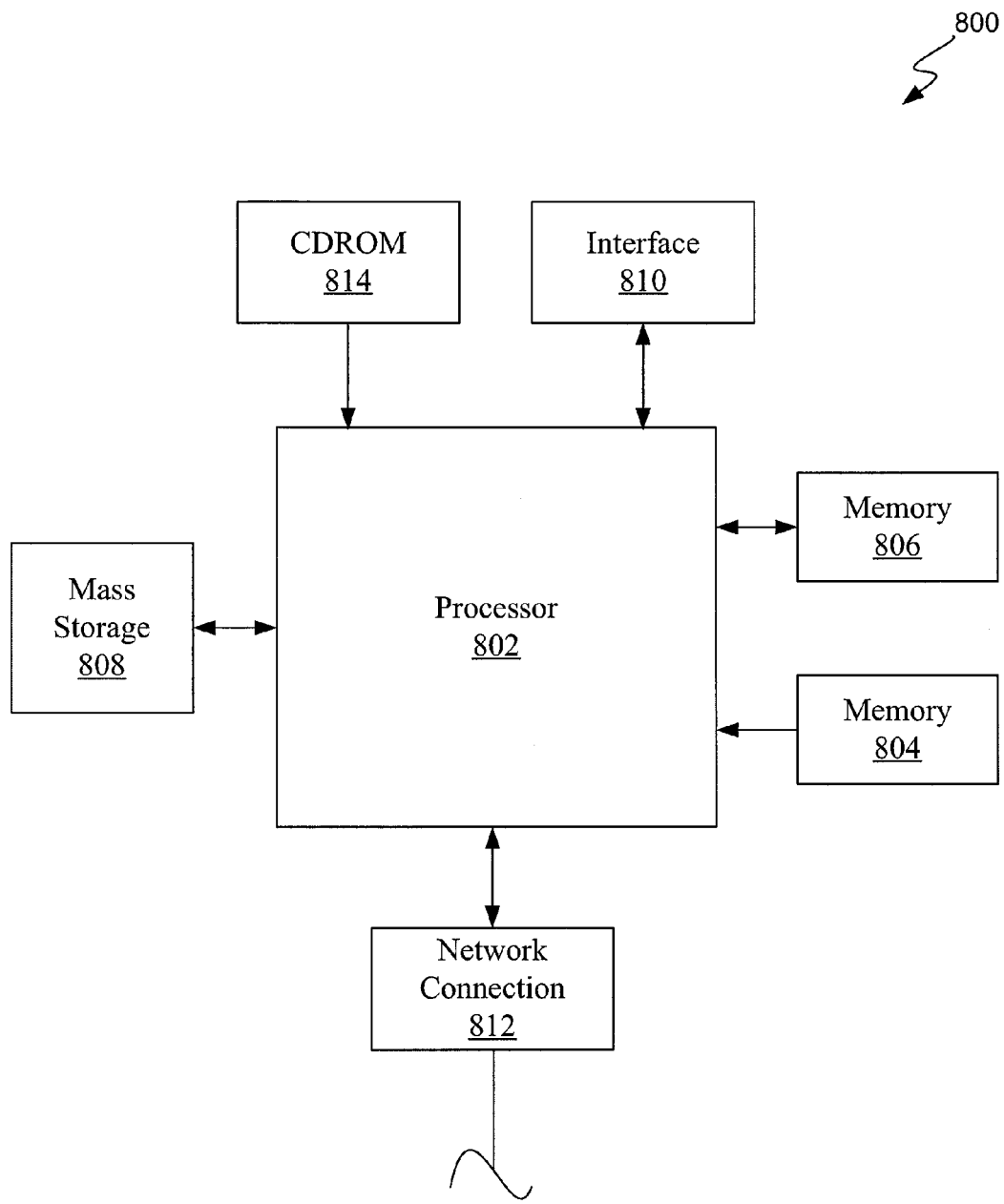
FIG. 8 illustrates a computer system suitable for implementing various embodiments of the present invention.

FIG. 8 illustrates a computer system suitable for implementing various embodiments of the present invention. The computer system 800 includes any number of processors 802 (also referred to as central processing units, or CPUs) that are coupled to devices including memory 806 (typically a random access memory, or "RAM"), memory 804 (typically a read only memory, or "ROM"). As is well known in the art, memory 804 acts to transfer data and instructions uni-directionally to the CPU and memory 806 is used typically to transfer data and instructions in a bi-directional manner.

Both of these memory devices may include any suitable type of the computer-readable media described above. A mass storage device 808 is also coupled bi-directionally to CPU 802 and provides additional data storage capacity and may include any of the computer-readable media described above. The mass storage device 808 may be used to store programs, data and the like and is typically a secondary storage medium such as a hard disk that is slower than memory. The mass storage device 808 can be used to hold a library or database of prepackaged logic or intellectual property functions, as well as information on generating particular configurations. It will be appreciated that the information retained within the mass storage device 808, may, in appropriate cases, be incorporated in standard fashion as part of memory 806 as virtual memory. A specific mass storage device such as a CD-ROM 814 may also pass data uni-directionally to the CPU.

CPU 802 is also coupled to an interface 810 that includes one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Video monitors can be used to display wizards and subwizards to a user. Finally, CPU 802 optionally may be coupled to a computer or telecommunications network using a network connection as shown generally at 812. With such a network connection, it is contemplated that the CPU might receive information from the network, or might output information to the network in the course of performing the above-described techniques. It should be noted that the system 800 may also be associated with devices for transferring completed designs onto a programmable chip. The above-described devices and materials will be familiar to those of skill in the computer hardware and software arts.

The hardware elements described above may be configured to act as multiple software modules for performing the operations of this invention. For example, instructions for running a tool, generator program, input stage (e.g., a wizard), and/or compiler may be stored on mass storage device 808 or 814 and executed on CPU 802 in conjunction with primary memory 806.

Although many of the components and processes are described above in the singular for convenience, it will be appreciated by one of skill in the art that multiple components and repeated processes can also be used to practice the techniques of the present invention.

While the invention has been particularly shown and described with reference to specific embodiments thereof, it will be understood by those skilled in the art that changes in the form and details of the disclosed embodiments may be made without departing from the spirit or scope of the invention. Therefore, the scope of the invention should be determined with reference to the appended claims.

What is claimed is:

1. A method comprising:
    identifying, at a circuit component having a port, an input for said port that changes multiple times during a single clock cycle;
    placing a register before said port so that the output of the register becomes the input to the port and the input to the port changes only once per clock cycle, wherein a toggle rate of said input is reduced and power is reduced in said circuit component.

2. A method as recited in claim 1 wherein said circuit component is a multiplier.

3. A method as recited in claim 1 wherein placing a register at an input to the circuit component requires retiming through other logic.

4. A method comprising:
    identifying, at a multiplier having a plurality of ports or a single port with multiple signals, inputs for the port or ports that change at different times during each clock cycle;
    placing registers before said port or ports so that outputs of the registers become the inputs to the port or ports of the multiplier, such that the inputs to the port or ports of the multiplier change at the same time during each clock cycle, wherein said inputs are synchronized such that glitches inside said multiplier are reduced causing power consumed by the multiplier to be reduced.

5. A method as recited in claim 4 wherein placing registers before said port of ports requires retiming through other logic.

6. A method comprising:
  identifying a component of an electronic design, the component having input ports for receiving input signals;
  identifying a power consumption rating for each of the input ports;
  updating the electronic design by assigning input signals to the input ports based on the power consumption ratings; and
  implementing the updated electronic design on the electronic device.

7. The method of claim 6, wherein the power consumption rating for each input port is based on the power consumed by the component for a toggle received at each input port.

8. The method of claim 6, wherein implementing the updated electronic design comprises:
  generating a logic description based on the updated electronic design.

9. The method of claim 8, wherein implementing the updated electronic design comprises:
  synthesizing the logic description; and
  generating a programming file based on the synthesized logic description, the programming file being operable to implement the synthesized logic description on the electronic device.

10. The method of claim 6, wherein a first input port has a higher power consumption rating than a second input port.

11. The method of claim 10, further comprising:
  determining the toggle rates of each of the input signals;
  connecting the input signal with the higher toggle rate to the second input port; and
  connecting the input signal with the lower toggle rate to the first input port.

12. The method of claim 6, wherein the electronic device is a programmable device.

13. The method of claim 6, wherein the electronic device is an application specific integrated circuit (ASIC) or custom integrated circuit (IC).

* * * * *